United States Patent [19]

Amberg et al.

[11] 4,189,987
[45] Feb. 26, 1980

[54] VEHICLE CAB TEMPERATURE CONTROL SYSTEM

[75] Inventors: Arthur A. Amberg, Plainfield; Ture R. Zetterlund, Naperville, both of Ill.

[73] Assignee: International Harvester Company, Chicago, Ill.

[21] Appl. No.: 921,384

[22] Filed: Jul. 3, 1978

[51] Int. Cl.² ............................................. B60H 1/24
[52] U.S. Cl. ..................................... 98/2.14; 98/2.15
[58] Field of Search ................... 98/2, 2.04, 2.05, 2.06, 98/2.08, 2.09, 2.1, 2.11, 2.14, 2.15, 2.19

[56] References Cited

U.S. PATENT DOCUMENTS

| | | | |
|---|---|---|---|
| 2,153,147 | 4/1939 | Lintern | 98/2.15 |
| 2,158,332 | 5/1939 | Lintern | 98/2.15 |
| 2,720,149 | 10/1955 | Groene | 98/2.15 |
| 3,555,846 | 1/1971 | Harbeck et al. | 62/244 |
| 3,626,713 | 12/1971 | Venable | 98/119 |
| 3,868,896 | 3/1975 | Doll et al. | 98/2.15 |
| 4,120,527 | 10/1978 | Lawerence | 98/2.11 |
| 4,140,047 | 2/1979 | Bowman et al. | 98/2.15 |

Primary Examiner—Henry C. Yuen
Attorney, Agent, or Firm—William H. Wendell; Ronald C. Kamp; F. David AuBuchon

[57] ABSTRACT

This improvement of a vehicle cab temperature control system for a cab having an operator enclosure with a roof and an outwardly exposed air filter attached to the roof includes a blower and a temperature control unit mounted within a duct which is secured to both the roof and to the air filter. The duct is spaced apart from the roof, thereby forming a chamber which receives controlled air from the temperature control unit. The flow of controlled air is produced by the blower as it moves the air through the air filter into the duct through its inlet aperture and then through the temperature control unit within the duct. The controlled air then exits the duct through either the duct's bleed aperture into the chamber or through the duct's outlet aperture into the operator enclosure.

6 Claims, 3 Drawing Figures

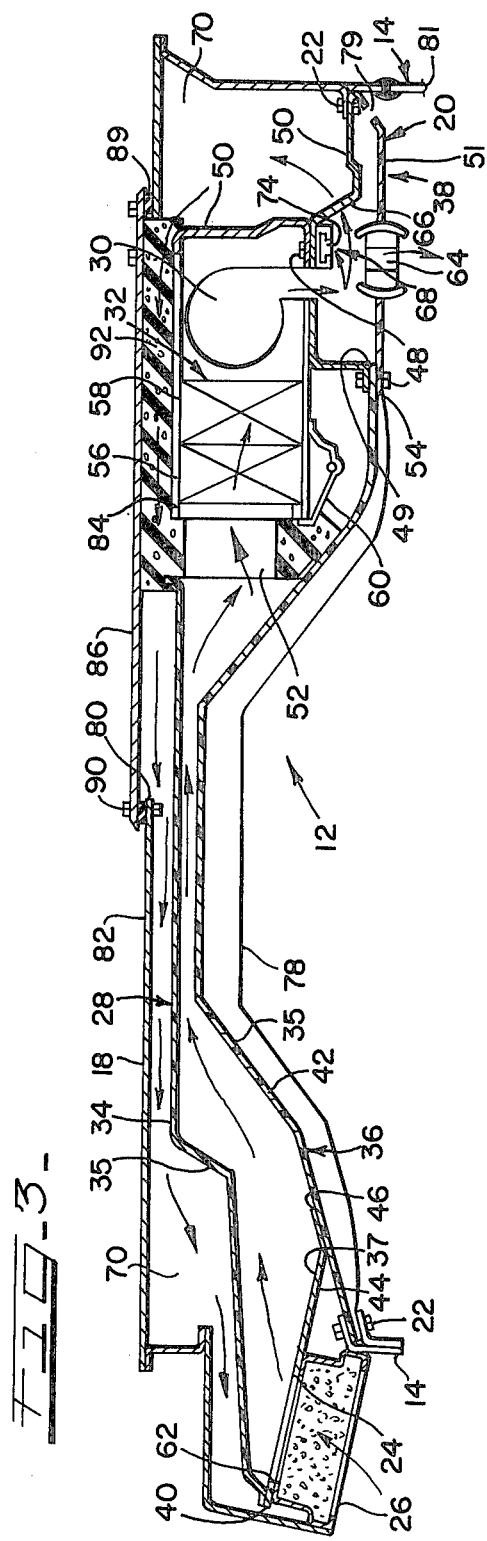

VEHICLE CAB TEMPERATURE CONTROL SYSTEM

BACKGROUND OF THE INVENTION

This invention relates generally to a vehicle cab ventilating system and more particularly concerns cab ventilating systems which control the temperature of the air entering the operator enclosure.

With the recent emphasis on shielding a vehicle's operator from the effects of airborne dirt and the extreme air temperature ranges in which the vehicles, such as tractors and other off the road vehicles, must operate, these vehicles are being equiped with cabs that have heating/air conditioning systems. Examples of these systems are found in U.S. Pat. Nos. 3,555,846, 3,626,713 and 3,868,896.

The systems described in these patents suffer from the weaknesses that have plagued the conventional systems since they were first introduced. The first weakness lies in the fact that the conventional systems do not have sufficient insulation of the temperature control system from the extreme temperature variances to provide an efficient temperature control system.

The second weakness is twofold, and arises from the fact that the air flow from the filter to the operator enclosure is sealed at the interface of large pieces formed from sheet metal. This sealing process is both ineffective and extremely costly to produce, because the massive size of the passage produces an incredibly long interface that must be sealed, while the violent nature and extreme temperature range of the working environment of the vehicle unduly shortens the effective life of the seal.

It is therefore an object of the present invention to provide a vehicle cab temperature control system which increases the efficiency of the system by effectively insulating the temperature control system from the extreme variances in the temperature of the vehicle's operating environment.

Moreover it is an object of the present invention to provide such a system with an effective seal between a temperature control system, and the dirt and temperature variances of the vehicle's working environment.

Finally, it is an object of the present invention to provide the vehicle cab temperatue control system described above that can be economically produced by the manufacturer of the vehicle.

SUMMARY OF THE INVENTION

This improvement of a vehicle cab temperature control system for a cab having an operator enclosure with a roof and an outwardly exposed air filter attached to the roof includes a blower and a temperature control unit mounted within a duct which is secured to both the roof and to the air filter. The duct is spaced apart from the roof, thereby forming a chamber which receives controlled air from the temperature control unit. The flow of controlled air is produced by the blower as it moves the air through the air filter into the duct through its inlet aperture and then through the temperature control unit within the duct. The controlled air then exits the duct through either the duct's bleed aperture into the chamber or through the duct's outlet aperture into the operator enclosure.

BRIEF DESCRIPTION OF THE DRAWINGS

Other objects and advantages of the invention will become apparent upon reading the following detailed description and upon reference to the drawings in which:

FIG. 3 is an enlarged sectional view along line 3—3 of FIG. 2.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
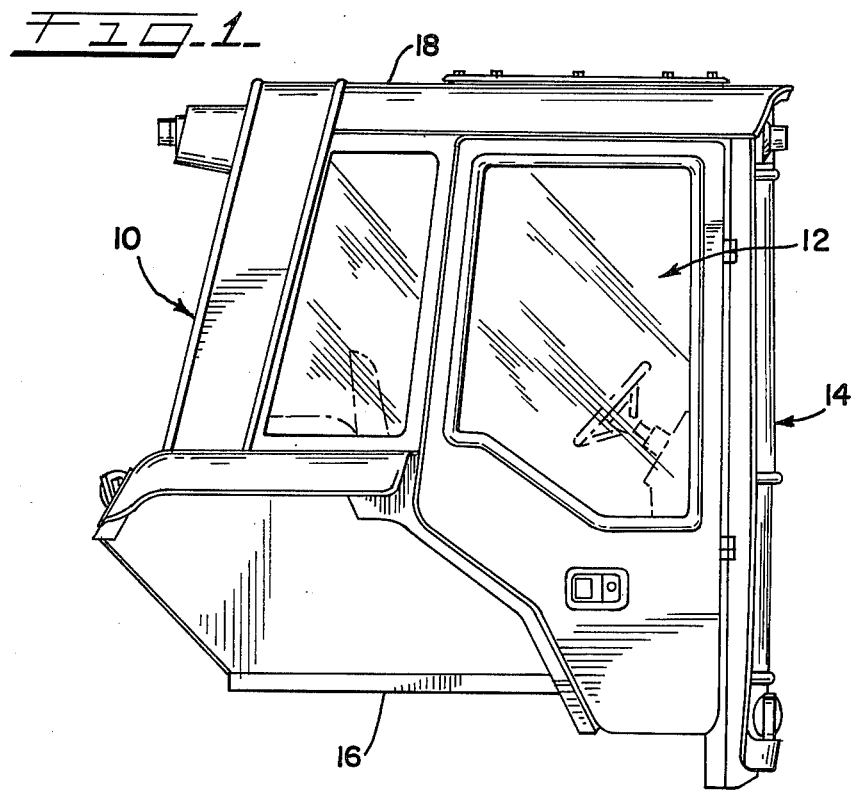
FIG. 1 is a right side view of a cab incorporating the invention.

Turning first to FIG. 1, there is shown a cab which incorporates the temperature control system of the present invention. The cab provides an operator environment 12 by sealibly connecting the walls 14, the floor 16 and the roof 18.

The temperature control system of the present invention is more clearly depicted in FIG. 3, which shows the temperature control system 20, secured to the operator enclosure by nuts and bolts at 22 and by bonding at 24. FIG. 3 also depicts the cab's air filter 26 conventionally secured to the roof 18 of the cab (the securing mechanism for the air filter is not shown).

The basic elements of the air temperature control system of the preferred embodiment are a duct 28, a blower 30 and an air temperature control unit 32. The duct of the illustrated embodiment includes a top panel 34 which is substantially C-shaped to provide the top and side surfaces of the rear portion of the duct 28, a headliner 36 which provides a substantial portion of the lower section of the duct 28 and an extension panel 38 which provides the entire front section of the duct.

The top panel 34 and the headliner 36 are molded fiberglass pieces 35 and sheet metal pieces 37 which are bonded together along their interface 40. In the particular system illustrated, the headliner is constructed by bonding a main element 42 with a rear panel 44 along their interface 46.

In the illustrated form, the extension panel 38 is formed by using a plurality of nuts and bolts 48 and calking 49 to rigidly connect and seal a plurality of sheet metal members 50 and plastic member 51. The interface between the extension panel 38, the top panel 34 and headliner 36 is sealed by a grooved foam connector 52 which fits over the exposed surface of the panels and headliner. In addition, the headliner 36 is secured and sealed by nuts and bolts 48 and calking 49 to the extension panel 38 along their interface 54.

In keeping with the preferred embodiment, the preferred embodiment has the blower 30 and the air temperature control unit 32 mounted within the extension panel 38 of the duct 28. The present air temperature control unit consists of an evaporator coil 56 utilized to reduce the temperature of the air within the operator enclosure 12, and a heater coil 58 utilized to increase the temperature within the operator enclosure 12. To facilitate the condensation produced when the evaporator coil 56 is in operation, the extension panel 38 is provided with a condensate removal system 60.

In addition to the above structure of the preferred embodiment's temperature control system, the headliner 36 includes an inlet aperture 62, and the extension panel 38 includes an outlet aperture 64, bleeder aperture 66 and bleeder passage 68. The bleeder aperture 66 and bleeder passage 68 provide the connection between the controlled air within the extension panel 38 and the air within the chamber 70. The chamber 70 is produced by the separation between the duct 28 and the roof 18.

Figure 2:
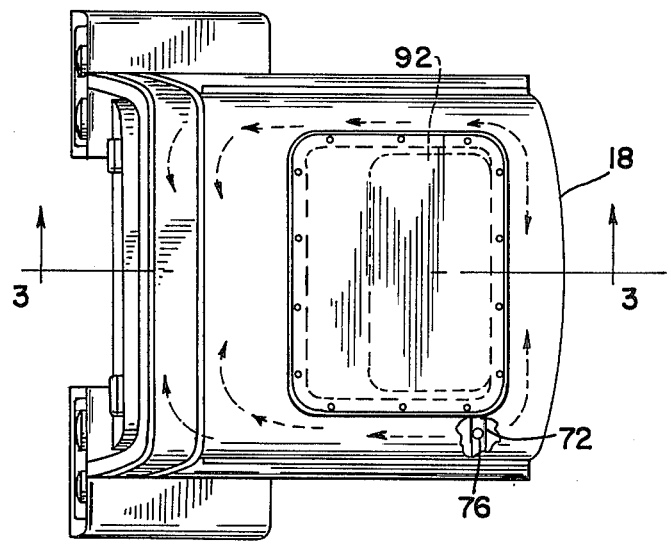
FIG. 2 is a top view of the cab of FIG. 1.

For a full description of the bleeder passage 68, reference must be made to both FIGS. 2 and 3. Turning first to FIG. 3, the passage 68 is shown in a tubular member 72 which is secured and sealed by nuts and bolts 48 and calking 49 to a sheet metal member 50 of extension panel 38. The tubular member 72 has an entrance aperture 74 whereby controlled air enters the tube. The controlled air is communicated to the chamber 70 when it exits the tube 72 and extension panel 38 through exit aperture 76, as shown in FIG. 2.

In carrying out the invention, the blower 30 draws air from outside the operator enclosure 12 through the air filter 26, the inlet aperture 62, between the headliner 36 and the top panel 34 and into the air temperature control unit 32. The air is then treated by either the evaporator coil 56 or the heater coil 58. The controlled air then passes through the blower 30, and exits into either the chamber 70 via the bleed aperture 66 and bleed passage 68 or into the operator enclosure 12 via the outlet aperture 64. Since the bleed aperture 66 and bleed passage 68 present a greater resistance to air flow than does the outlet aperture 68 due to the larger opening of the outlet aperture 64, the great majority of the controlled air will enter the operator enclosure 12.

To insulate the operator enclosure from the outside air passing through the duct 28 the headliner of the preferred embodiment is provided with a foam barrier 78, thereby reducing the heat transmission between the duct 28 and the operator enclosure 12. In addition, the preferred embodiment has a defrosting aperture 79 in the extension panel 38 to provide a constant flow of controlled air over the cab windshield 81.

The preferred embodiment also provides access to the air temperature control unit 32 and the blower 30. This access is produced by a service aperture 80 and the cover plate 82 of the roof 18 and an access aperture 84 in the extension panel 38. The integrity of the chamber 70 is maintained by sealing the cover plate 82 with a service plate 86 and a gasket 89, with the service plate 86 being secured to the cover plate 88 by nuts and bolts 90. This sealing arrangement eliminates the leakage of air into the chamber 70 through the service aperture 80, while a foam member 92 is compressed between the extension panel 38 and the cover plate 82 to prevent leakage of uncontrolled air from the duct 28 through the access aperture 84 into the chamber 70.

From the foregoing it will be seen that the present invention provides a vehicle cab air temperature control system which increases the efficiency of the system by utilizing a pressurized chamber of controlled air to insulate the system from the temperatures existing outside the system, while increasing the effectiveness and decreasing the cost of protecting the system against leaks of external dirt and uncontrolled air into the system by maximizing the bonded interfaces of the system elements thereby minimizing the conventionally sealed interfaces of the element.

Thus it is apparent that there has been provided, in accordance with the invention, a vehicle cab air temperature control system that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. In a vehicle cab air temperature control system for a cab having an operator enclosure with a roof and an outwardly exposed air filter means attached to the roof of said operator enclosure, the improvement including, in combination:

a duct secured within said operator enclosure in close proximity below and in spaced relationship to said roof, thereby providing an insulating chamber containing trapped air between substantially the entire expanse of said roof and said duct, said duct is secured to said air filter means and has an inlet aperture adjacent said air filter means within said enclosure to provide an air passage between said duct and said air filter means, an outlet aperture spaced from said inlet aperture to provide an air passage between said duct and said enclosure and a bleed aperture located between said inlet and said outlet apertures to provide an air passage between said duct and said chamber;

blower means mounted within said duct for supplying a flow of air from outside said air filter means through said air filter means, said inlet aperture, said duct, into said operator enclosure through said outlet aperture and into said chamber through said bleed aperture; and temperature control means mounted within said duct between said bleed aperture and said inlet aperture for controlling the temperature of the air flowing from said duct into said operator enclosure and said chamber.

2. A temperature control system of claim 1, wherein:
said duct includes a headliner, top panel and an extension panel sealibly secured together.

3. A temperature control system of claim 2, wherein:
said extension panel includes an access aperture;
said roof includes a cover plate having a service aperture aligned with said access aperture and a service plate secured to said cover plate over said service aperture;
seal means positioned between said cover plate, said service plate, said service aperture and said access aperture for sealing said chamber from uncontrolled air; and
said temperature control means as positioned in close proximity to said access aperture.

4. A temperature control system of claim 2, wherein:
said inlet aperture is in said headliner, and said bleed and outlet apertures are in said extension panel.

5. A temperature control system of claim 4, wherein:
said extension panel includes an access aperture;
said roof includes a cover plate having a service aperture aligned with said access aperture and a service plate secured to said cover plate over said service aperture;
seal means positioned between said cover plate, said service plate, said service aperture and said access aperture for sealing said chamber from uncontrolled air; and said temperature control means as positioned in close proximity to said access aperture.

6. A temperature control system of claim 5, wherein:
said access aperture is located between said bleed aperture and said inlet aperture in said air flow; and
said seal means which includes a gasket between said service plate and said cover plate, and a foam member between said service plate and said extension panel.

* * * * *